United States Patent [19]
Kabai

[11] 3,980,104
[45] Sept. 14, 1976

[54] HOSE OR PIPE FOR SPRINKLING OR IRRIGATION

[75] Inventor: Deszö Kabai, Blankenloch Buchig, Germany

[73] Assignee: Interdisciplin Forschungsgesellschaft m.b.H. Entwicklungs K.G., Karlsruhe, Germany

[22] Filed: Jan. 8, 1975

[21] Appl. No.: 539,600

[30] Foreign Application Priority Data
Jan. 9, 1974   Germany............................ 2400797

[52] U.S. Cl............................... 138/103; 239/534; 239/535; 239/547; 239/601
[51] Int. Cl.²......................... B05B 1/20; B05B 1/30
[58] Field of Search............. 239/76, 452, 534, 535, 239/536, 546, 547, 562, 602, 601; 138/45, 46, 103

[56] References Cited
UNITED STATES PATENTS

| | | | |
|---|---|---|---|
| 2,070,665 | 2/1937 | Lepper | 239/547 |
| 2,314,525 | 3/1943 | Summers | 239/547 |
| 2,454,929 | 11/1948 | Kempton | 138/45 |
| 2,716,574 | 8/1955 | Chase | 239/547 |
| 2,891,578 | 6/1959 | Dahl et al. | 138/45 |
| 3,546,884 | 12/1970 | Timpé | 239/534 |
| 3,693,888 | 9/1972 | Rondas et al. | 239/535 |
| 3,917,169 | 11/1975 | Harmony | 239/547 |

FOREIGN PATENTS OR APPLICATIONS

| | | | |
|---|---|---|---|
| 61,376 | 11/1954 | France | 138/45 |

*Primary Examiner*—Harry N. Haroian
*Assistant Examiner*—Richard R. Stearns
*Attorney, Agent, or Firm*—Edwin E. Greigg

[57] ABSTRACT

A hose or pipe for sprinkling liquids, e.g. water or liquid manure, has outlet orifices along its length. These orifices are located in an elastically deformable portion of the hose or pipe. The stress-free shape of the elastic portion is so chosen that when the interior fluid pressure changes, the free aperture of the orifice also changes. By a suitable choice of hose shapes the net flow rate through the orifice may be made independent of the internal fluid pressure.

2 Claims, 9 Drawing Figures

HOSE OR PIPE FOR SPRINKLING OR IRRIGATION

BACKGROUND OF THE INVENTION

The invention relates to a hose or a pipe for sprinkling or irrigation provided with outlet orifices located at certain intervals along the length of the hose or pipe.

Such hoses or pipes for sprinkling water or liquid manure are already known. In the known apparatus, the flow rate through the individual orifices depends heavily on the local fluid pressure prevailing in the hose. The primary inlet pressure supplied at one end of the hose decreases very rapidly along the increasing length of the hose due to frictional losses and due to the pressure losses at the various orifices, resulting in great differences in the flow rate through the orifices along the length of the hose. For this reason, only relatively short lengths of hose can be used in practice if it is desired that the flow rate through the individual orifices be reasonably uniform, along the length of the hose.

OBJECT AND SUMMARY OF THE INVENTION

It is a principal object of the invention to provide a hose or pipe for sprinkling or irrigation in which the flow rate of fluid through the individual orifices remains constant and is equal along the length of the hose. This object is attained, according to the invention, by providing a hose whose outlet orifices are apertures in an elastic material, e.g. rubber or plastic and are located in concave or convex bulges of the hose. These orifices experience a geometric deformation when the shape and curvature of the surrounding elastic material changes depending on the local, internal fluid pressure. The deformation of the orifices is such that the flow rate at the individual apertures remains the same over the entire length of the hose even though the internal local fluid pressure is different at each orifice.

According to the invention, when rigid pipes are to be used, the outlet orifices are located in elastic inserts which are placed in suitable periodic openings of the rigid pipe and which effect the closure function. Since the out-flow rate remains constant along the length of the hose or pipe, the sprinkler installations can be very long, thus reducing the need for multiple sprinkling or irrigation apparatus.

A sprinkling system of this type which exhibits uniform flow regardless of length is very much in demand for agricultural as well as industrial applications.

In summary, the fluid flow regulating mechanism is provided by making the hose capable of undergoing variations of curvature, wall thickness and cross-section. Deformation of the shape or cross-section of the hose under internal fluid pressure changes the shape of the orifices in the hose and creates a pressure-dependent closure mechanism which holds the outflow rate constant.

The invention will be better understood and further objects as well as advantages thereof will become more apparent from the ensuing detailed specification of four exemplary embodiments of the invention taken in conjunction with the drawing.

DESCRIPTION OF THE PREFERRED EMBODIMENTS

Figure 1:
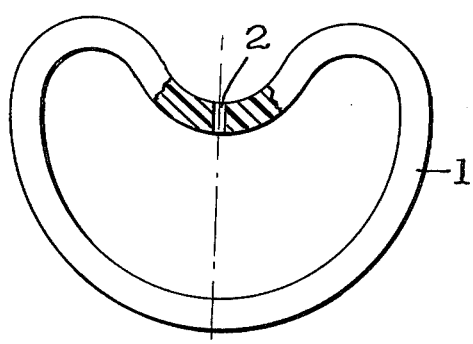
FIG. 1 is a cross-section through a first exemplary embodiment of a sprinkling hose according to the invention with a heart or kidney-shaped cross-section.
Figure 1A:
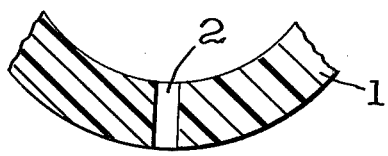
FIG. 1A is an enlarged picture of part of the hose of FIG. 1, showing the orifice in the pressure-free state.
Figure 1B:
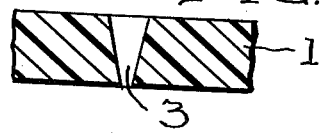
FIG. 1B shows the same orifice when the hose is pressurized.

FIG. 1 shows a hose 1 in the pressure-free, i. e. relaxed state, containing an orifice 2. FIG. 1A is an enlarged view of a portion of FIG. 1. The outlet orifice 2 plays a critical role in the flow regulation. In FIGS. 1 and 1A, the orifice 2 has a cylindrical shape.

When the hose is internally pressurized, its walls are deformed and tend to assume a tubular shape with circular cross-section. The enlarged sectional drawing 1B shows the deformed orifice 3 just prior to the time when the hose assumes a circular cross-section. It may be seen that the outlet orifice has been elastically deformed from its original cylindrical shape to a conical shape with an elliptical cross-section. This deformation has decreased the cross-section of the hole in the inside wall of the hose and the flow resistance has therefore been correspondingly increased. Due to the kidney-shaped cross-section of the hose, the changing internal fluid pressure changes the outflow resistance so as to just compensate for the increased outflow which would occur as a consequence of the increased pressure, i. e. the outflow rate remains constant over a large pressure domain.

Figure 2:
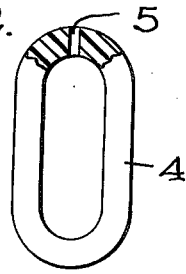
FIG. 2 is a cross-section of a second example showing a flattened hose in the pressure-free state.
Figure 2A:
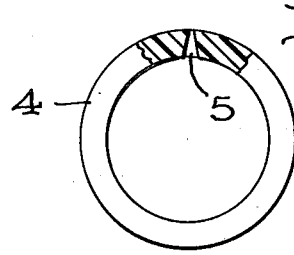
FIG. 2A shows the hose according to FIG. 2 in the pressurized state.
Figure 3:
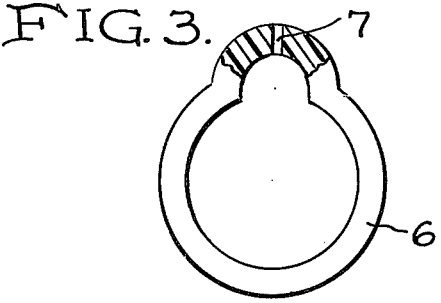
FIG. 3 is the cross-section of a hose having a convex bulge in the pressure-free state.
Figure 3A:
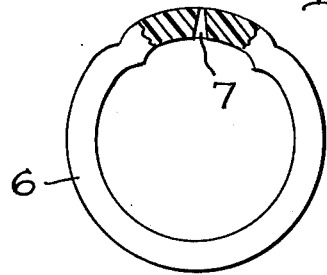
FIG. 3A shows the hose according to FIG. 3 in the pressurized state.

A second exemplary embodiment of a flow-regulating sprinkler hose according to the invention is shown in FIGS. 2 and 2A. Similarly as in FIG. 1, the pressure-free flat hose 4 has an orifice 5 of cylindrical cross-section which assumes a conical shape 5, as seen in FIG. 2A, when the hose bulges due to the internal fluid pressure. The function of the two exemplary embodiments shown in FIGS. 2 and 3 is the same, in principle, as of that in FIG. 1, but in the two exemplary embodiments of FIGS. 2 and 3, it is the cross-section of the orifice near the outside wall of the hose that is decreased, rather than that near the inside wall, as in FIG. 1.

Figure 4:
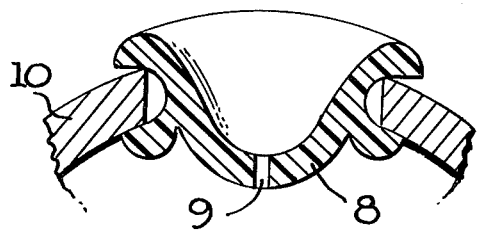
FIG. 4 is a sectional diagram of an elastic insert for a rigid pipe, in the pressure-free state.

FIG. 4 depicts a fourth exemplary embodiment of the invention wherein the flow-regulating apparatus according to the invention is shown as used in a rigid pipe 10. A deformable elastic plug or plate 8 with an outlet orifice 9 is inserted into a hole within the pipe 10. The function of this deformable plug is analagous to the deformable region of the examplary embodiments according to FIGS. 1, 2 and 3.

Figure 4A:
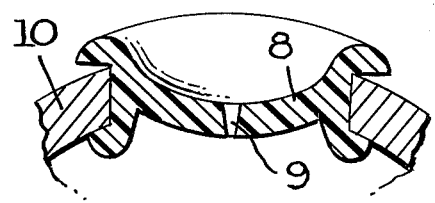
FIG. 4A shows the elements of FIG. 4 when the pipe is internally pressurized.

When the internal pressure of the pipe increases, the wall of the plug 8 bulges outwardly as shown in FIG. 4A, thereby decreasing the cross-section of the orifice 9 near the interior wall surface of the plug 8.

What is claimed is:

1. An apparatus for dispensing fluids comprising:
   a. a pipe, for suitable connection to a source of pressurized fluid and provided with a plurality of openings in its wall; and
   b. deformable plates, each having a pair of opposed annular flange members which engage the rim of one of said wall openings within said pipe, there being one deformable plate in each of said openings, and each of said plates containing an orifice through which said fluid under pressure may flow, the minimum cross-section of each orifice becoming smaller with increasing pressure during the pressure-dependent deformation of said deformable plates making the fluid flow rate through each of the orifices in said plurality of deformable plates substantially independent of internal fluid pressure.

2. A hollow conduit for dispensing fluids with a flexible tubular wall which has a predetermined longitudinal extent and which has transverse cross-sectional profiles throughout said extent and which includes orifices defined only by perforations of the flexible wall of the conduit for outward passage of fluid therethrough, said transverse cross-sectional profiles and said orifices having a given configuration in the relaxed un-pressurized state of said conduit and assuming a different configuration when the flexible wall of the conduit deforms under internal fluid pressure, said orifices presenting a smaller opening for fluid to pass therethrough as the degree of deformation of said walls becomes greater, thereby making the outward fluid flow rate through said orifices substantially independent of internal fluid pressure.

* * * * *